United States Patent [19]

Roess

[11] 3,763,441

[45] Oct. 2, 1973

[54] DEVICE FOR PHASE-SYNCHRONIZATION OF SEVERAL LASER OSCILLATORS

[75] Inventor: Dieter Roess, Planegg, Germany

[73] Assignee: Siemens Aktiengesellschaft, Berlin & Munich, Germany

[22] Filed: June 12, 1972

[21] Appl. No.: 261,941

[30] Foreign Application Priority Data
June 29, 1971 Germany............... P 21 32 281.6

[52] U.S. Cl. .............................................. 331/94.5
[51] Int. Cl. ................................................ H01s 3/08
[58] Field of Search ................................... 331/94.5

[56] References Cited
UNITED STATES PATENTS
3,577,093   5/1971   Simpson........................... 331/94.5
3,435,371   3/1969   White ............................... 331/94.5

Primary Examiner—William L. Sikes
Attorney—Benjamin H. Sherman et al.

[57] ABSTRACT

A device for phase synchronization of several laser oscillators characterized by several partial laser oscillators, each of which has active material and a first reflecting mirror, being arranged with a common second reflecting mirror to complete the resonators of each partial oscillator, and an optical component which is disposed between the common second mirror and the active material of each partial oscillator for phase coherent superposing the partial waves from each partial oscillator to create a single summation wave which is phase synchronized and coherent. The optical component can be a grating or a hologram which is preferably a volume phase hologram. The device is particularly useful for providing a pumping device for a solid state laser which device uses semiconductor lasers.

8 Claims, 1 Drawing Figure

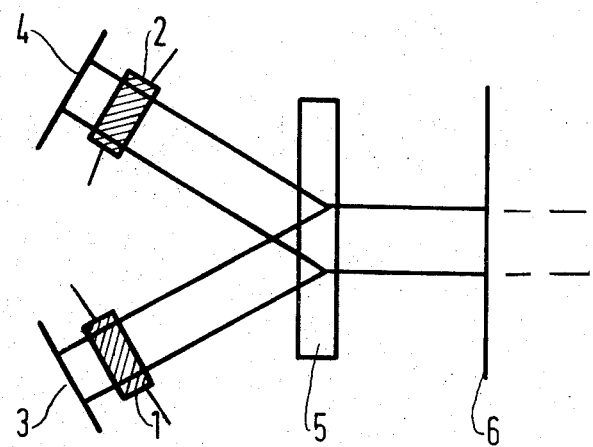

DEVICE FOR PHASE-SYNCHRONIZATION OF SEVERAL LASER OSCILLATORS

BACKGROUND OF THE INVENTION

1. Field of the Invention

The present invention is directed to a device for producing a phase synchronized summation wave from the waves of several laser oscillators.

2. Prior Art

In a laser, particularly a laser diode, the amplification of the electromagnetic performance is based on the utilization of absorption and emission procedure in the laser material. Since the internal energy of material is only present in specific energy levels which levels are the energy levels assumed by particles such as atoms, molecules or electrons, the release or the acceptance of energy by the material generally takes place in discreet amounts of energy. These discreet amounts of energy are determined by the energy distances between respective energy levels which levels participate in the energy release or acceptance. The energy distance between two levels $E_m$ and $E_n$ is given by the relationship: $E_m - E_n = h\nu$, where $h$ is Planck's constant and $\nu$ is a frequency determined by the difference between the two energy levels. According to this relationship, if an energy of $h\nu$ is absorbed by a particle in the energy level $E_n$, the particle will move to a higher energy level $E_m$. During release of energy, the particle which is in the energy level $E_m$ releases radiation energy $h\nu$ as it moves or returns to a lower energy level $E_n$.

If the phase and direction of the emitted radiation energy are different, a so-called "spontaneous emission" occurs which is incoherent and not suitable for amplification. The "spontaneous emission" is the reason for noise.

The amplification mechanism is based on so-called "induced emission" which is obtained by the following procedure. If a radiation quantum $h\nu$ strikes a stimulated particle in the energy level $E_m$, the particle can pass into the lower energy level $E_n$ by emitting a radiation quantum $h\nu$. However, in this case both energy quanta have the same phase and direction unlike the case of spontaneous emission. The electromagnetic radiation is coherent and reinforced because of the quantum doubling.

In the optical area, simple energy sources, whose radiation have the same frequency and the same phase, are not available with sufficient perforance. Therefore, the quantum transitions which are caused by the light energy do not take place in the same phase. By utilizing a multitude of equal-phase pump-energy sources of the same frequency such as a plurality of laser diodes, it is a possibility to increase the pump performance for a laser having an extended crystal laser material. However, the laser diodes must be synchronized in phase.

SUMMARY OF THE INVENTION

The present invention is directed to a device which makes a phase-like synchronization of several laser oscillators possible. This is accomplished with a device comprising several partial laser oscillators with each oscillator having active material and a first reflector which partial oscillators are arranged with a second reflector to complete the resonator of each oscillator. To provide a single summation wave, which is coherent and phase synchronized, means such as a coherent optical component is arranged between the second reflector and the laser material of each partial oscillator to phase-coherent superpose the partial waves from each of the partial oscillators. The optical component can be a grating, or a hologram which in the preferred embodiment is a volume phase hologram. The device can be used in a laser oscillator for providing a pumping means for a solid state laser body.

BRIEF DESCRIPTION OF THE DRAWING

The FIGURE is a schematic illustration of the device according to the invention.

DESCRIPTION OF THE PREFERRED EMBODIMENT

The principles of the present invention are particularly useful in a device illustrated in the FIGURE which has a pair of partial laser oscillators 1 and 2, for example semiconductor lasers, which includes a laser-active material having electrodes for applying a pumping energy to the material in a conventional manner and a first reflector 3 and 4, respectively. The device further includes means, such as a coherent optical component 5, for superposing the partial waves from the partial oscillators 1 and 2 as a single summation wave, which is coherent and phase-synchronized, onto a second reflector 6. The second reflector 6, which may be partially permeable to enable removal of the superimposed wave in a conventional manner, is a common reflector for the two partial oscillators 1 and 2 and completes the resonator structure for these oxcillators.

The coherent optical component can be a grating which is preferably provided as a hologram. The hologram should be a volume phase hologram because of its high efficiency.

The principle of the invention is based on the recognition that by uniting the beams of different partial resonators by means of a component, which has the characteristic to create a phase-coherent superimposing of its partial waves as one single summation wave which is simply defined in amplitude and phase, all partial beams or waves have to be coherent. In such a system each single oscillator has the lowest threshold, and if it preoscillates with all other oscillators in a phase-coherent way, a coherent oscillation of all partial systems will necessarily result from the noise.

Preferably the coherent optical component is a hologram which reveals an interference structure or pattern. The hologram is created by superimposing a spherical wave with a series of spherical waves from the various single resonators of the partial oscillators and the hologram is located at the beam waist of the superimposed spherical waves. Such a hologram reconstructs a plane wave by means of illumination with a multitude of identical coherent partial waves and the plane wave is reflected back by the common second reflector into the system. In the case of an incoherent partial wave, a complicated spacial refraction pattern with timewise fluctuations is created and only a slight fraction of the refraction pattern is reflected back from the common reflector.

The coherent optical component 5 can be realized as a hologram for a random number of partial laser oscillators. If a volume phase hologram is used as the coherent optical component 5, an efficiency of nearly 100 percent can be achieved and a large variety of types of laser oscillators can be phase synchronized.

The device of the invention is especially well suited for providing the pumping means in a laser having a solid state laser body disposed in a resonator. The laser body such as a crystal laser can be pumped axially by the device utilizing a large number of semiconductor lasers.

Although minor modifications might be suggested by those versed in the art, it should be understood that I wish to employ within the scope of the patent granted hereon, all such modifications that reasonably and properly come within the scope of my contribution to the art.

I claim:

1. A device for providing a single phase synchronized laser wave, comprising several partial laser oscillators with each oscillator having active material for producing a partial wave and a first reflector, a second reflector arranged with the partial oscillators to provide a common second reflector to complete the resonator and each oscillator, and means comprising a hologram disposed between a common reflector and the active material of each partial oscillator for phase-coherent superposing the partial waves from each of the partial oscillators to create a single, phase-synchronized coherent summation wave.

2. A device according to claim 1, wherein the hologram is a grating.

3. A device according to claim 2, wherein the hologram is a volume phase hologram.

4. A device according to claim 2, wherein the hologram is an interference structure which is created by superposing an approximate spherical wave with a series of spherical waves of the various partial resonators with the hologram located at the beam waist of the superposed waves.

5. A device according to claim 1, wherein the hologram is an interference structure which is created by superposing an approximate spherical wave with a series of spherical waves of the various partial resonators with the hologram located at the beam waist of the superposed waves.

6. A device according to claim 1, wherein the hologram is a volume phase hologram.

7. A device according to claim 6, wherein the hologram is an interfrerence structure which is created by superposing an approximate spherical wave with a series of spherical waves of the various partial resonators with the hologram located at the beam waist of the superposed waves.

8. In a laser device having a solid state laser body disposed in a resonator and means for pumping the laser body the improvement comprising the pumping means comprising several partial oscillators with each oscillator having active material for producing a partial wave and a first reflector, a second reflector to complete the partial resonators and each of the oscillators, and means disposed between the common second reflector and the active material of each partial oscillator for phase-coherent superposing the partial waves for each of the partial oscillators to create a single phase synchronized, coherent summation wave for axially pumping the solid state laser body.

* * * * *